United States Patent [19]

Enkegaard

[11] Patent Number: 4,695,325

[45] Date of Patent: Sep. 22, 1987

[54] METHOD AND APPARATUS FOR PRODUCING CLINKER

[75] Inventor: Torben Enkegaard, Copenhagen, Denmark

[73] Assignee: F. L. Smidth & Co. A/S, Copenhagen, Denmark

[21] Appl. No.: 849,770

[22] Filed: Apr. 9, 1986

[30] Foreign Application Priority Data

Jun. 3, 1985 [GB] United Kingdom ................ 8513967

[51] Int. Cl.[4] ................................................ C04B 7/60

[52] U.S. Cl. ..................................... 106/100; 432/106

[58] Field of Search ......................... 106/100; 432/106

[56] References Cited

U.S. PATENT DOCUMENTS

| | | | |
|---|---|---|---|
| 3,692,287 | 9/1972 | Kohl et al. | 106/100 |
| 3,784,389 | 1/1974 | Hastrup | 106/100 |
| 4,115,137 | 9/1978 | Nudelman et al. | 106/100 |

*Primary Examiner*—William R. Dixon, Jr.
*Assistant Examiner*—Steven Capella
*Attorney, Agent, or Firm*—Brumbaugh, Graves, Donohue & Raymond

[57] ABSTRACT

A kiln plant for producing cement of other clinker from chloride-containing raw material has a kiln (2), a suspension preheater (4,5,6,7) through which kiln exit gas passes to a precipitator (8), and a by-pass conduit (11,14) through which a portion of the kiln exit gas passes via an air quenching unit (12) to the precipitator without encountering any further precipitator.

3 Claims, 1 Drawing Figure

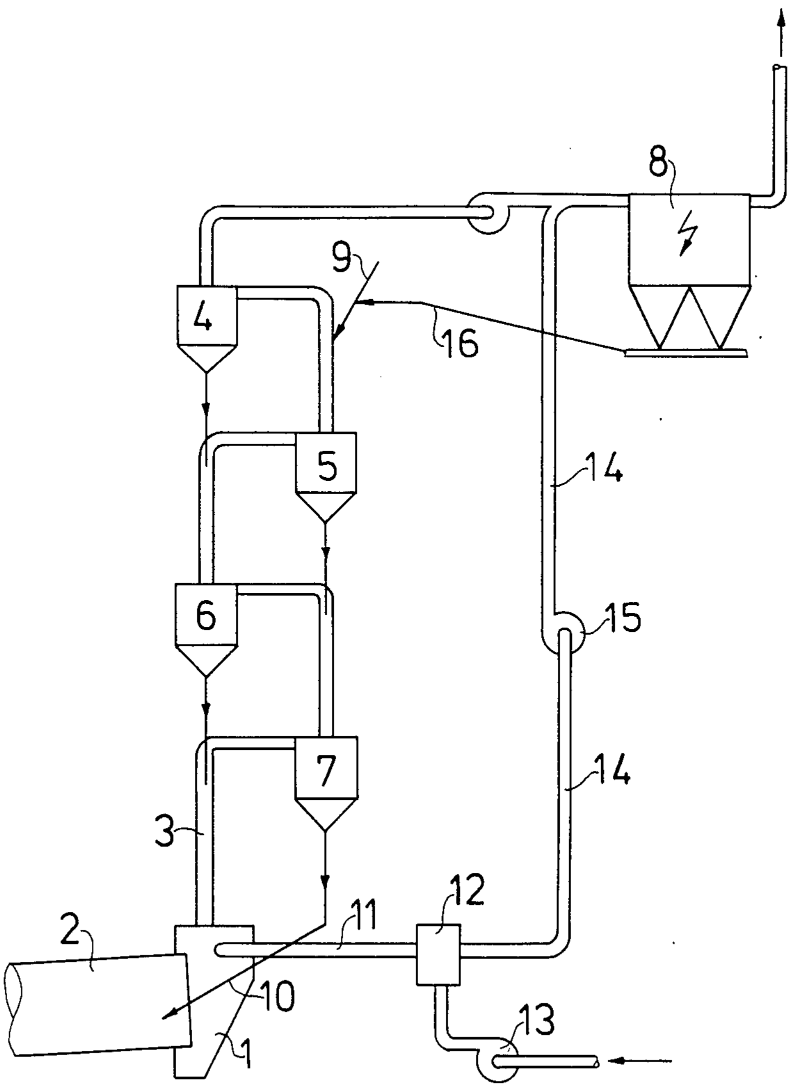
8
9
4
16
5
14
6
15
14
7
3
12
11
2
10
13
1

METHOD AND APPARATUS FOR PRODUCING CLINKER

The invention relates to a method of producing clinker, particularly but not necessarily cement clinker, from chloride-containing cement raw material in kiln plant having a, usually rotary, kiln at least one suspension preheater heated by kiln exit gas and possibly also spent cooler air, possibly at least one precalciner, and, usually, a material cooler. The exit gas from the preheater is passed to a precipitator or filter.

A rotary kiln plant of the above kind is shown, e.g. from U.S. Pat. No. 3,365,521, according to which the suspension preheater comprises several cyclones, through which the exit gas is conveyed countercurrently to raw material supplied through the preheater into the kiln, so that the raw material is preheated whereas the exit gas is cooled in the preheater.

The exit gas, which, during the heat exchange with the raw material, picks up material dust, is passed from the preheater to an electrostatic precipitator wherein the exit gas is cleaned of dust prior to being vented into a chimney.

If the raw material contains chlorides the latter will evaporate in the kiln and be fed as a pollutant in the kiln exit gas to the suspension preheater where the chlorides will condense and precipitate on the raw material and so be recirculated back to the kiln. In this way an increasing quantity of unwanted chlorides accumulates in the raw material passed to the kiln.

This circulating chloride content can be reduced according to the above mentioned U.S. specification if a portion of the outflowing exit gas from the kiln is caused to by-pass the preheater by means of a by-pass and quenched by air, whereby the chlorides condense and are precipitated in a separate by-pass precipitator together with material dust contained in this exit gas and hence are removed from the process. Dust leaving the preheater entrained in the exit gas and precipitated in the main precipitator of the plant may, however, be reused in the process.

GB-A-1319180 disclosed a plant which, compared to the plant of U.S. Pat. No. 3,365,521 has only one electrostatic precipitator for the dedusting of the exit gas both from the preheater and from the by-pass. However, in the by-pass conduit a cyclone separator acting as a precipitator is inserted after a mixing box, in which the exit gas is quenched by atmospheric air, this separator being intended for separating larger material particles with a low alkali content from the exit gas, while the very small material particles and the condensed alkalies and chlorides passes through the cyclone separator without separation to the only precipitator of the plant. As GB-A-1319180 explains it follows that material precipitated in the cyclone separator contains only a small amount of chlorides and may be recycled, whereas material precipitated in the electrostatic precipitator has to be removed from the process owing to the fact that it contains a large percentage of chlorides coming from condensed chlorides passing the cyclone separator and agglomeraing to particle sizes which will be caught by the electrostatic separator.

It is a drawback of the method according to GB-A-1319180 that not only alkali and chloride dust from the by-pass, but also all dust in the exit gas from the preheater are removed and consequently not utilized in the process.

It has now been found that when using raw material having a comparatively small chloride content, i.e. of 0.015–0.1 weight percent, it is possible to reduce the chloride content in the clinker through a more uncomplicated method than the ones mentioned above.

This is achieved, in accordance with the invention, by a method of producing clinker from raw material with a chloride content of 0.015–0.1 weight percent in a kiln plant having at least one suspension preheater through which kiln exit gas is passed to a primary precipitator or filter, a portion of the chloride-containing kiln exit gas, which is caused to by-pass the suspension preheater, being quenched, characterized in that the by-passing exit gas portion is passed after the quenching to the primary precipitator or filter without first encountering a separate precipitator or filter.

This new method thus saves one electrostatic precipitator as compared to the method according to U.S. Pat. No. 3,365,521, and a cyclone separator in the by-pass conduit for precipitation of exit gas dust low in alkali as compared to GB-A-1319180.

Further, it has been found that with a comparatively low chloride content in the raw material chlorides do not precipitate in the precipitator, and thus all dust collected by the precipitator or filter can be reutilized in the process.

The fact that chlorides do not precipitate in the precipitator is due to the fact that the chloride content in the by-pass gas remain in the form of vapour or very small particles which are not caught by the electrostatic or other precipitator or filter.

The invention also includes a plant for carrying out the method according to the invention, the plant comprising a kiln, a suspension preheater connected between an exit gas outlet of the kiln and a primary precipitator or filter whereby material being fed to the kiln is preheated by the kiln exit gas in the preheater and the gas passes from the preheater to the primary precipitator or filter, and a by-pass conduit connecting the kiln exit gas outlet to the primary precipitator or filter via an air quenching unit and in parallel with the preheater, the by-pass conduit being devoid of any further precipitator or filter between the air quenching unit and the primary precipitator or filter.

The invention will now be explained in more detail with reference to the accompanying drawing, which shows diagrammatically one example of a plant according to the invention for producing cement clinker.

Exit gas from a rotary kiln 2 is passed via an outlet housing 1 and a conduit 3 to a cyclone preheater, which in the example shown comprises four cyclones 4, 5, 6 and 7.

From the cyclone preheater 4–7 the exit gas is passed to an electrostatic precipitator 8.

Raw material to be treated in the plant is supplied to the cyclone preheater via an inlet 9, and passes through the preheater in conventional manner countercurrently to the exit gas, whereby the raw material is preheated and the exit gas simultaneously cooled. Preheated material from the preheater 4–7 is passed to the kiln, via a duct 10.

To reduce the chloride content in the finished cement clinker a portion of the exit gas is extracted from the outlet housing 1 through a by-pass conduit 11. The gas portion is passed through an air quenching unit 12, supplied with atmospheric air by a fan 13, whereafter this exit gas portion is passed on through a conduit 14, if necessary helped by a fan 15, to the main precipitator 8 of the plant.

The chloride-containing raw material is heated in the rotary kiln 2 to a temperature so high that the chlorides evaporate and, entrained by the exit gas, are primarily passed through the conduit 3 to the preheater 4–7, where they are cooled down so that they condense and precipitate on the raw material particles which are also precipitated from the kiln exit gas. The chlorides are then returned to the kiln with the raw material particles.

By means of the by-pass conduit 11 a portion of the exit gas by-passes the preheater 4–7 thus avoiding an increasing content of chlorides circulating in the process.

The chlorides being present in vapour form in this by-passed exit gas portion condense upon quenching with air in the quenching unit 12 and are, together with the by-passed exit gas portion, conveyed to the electrostatic precipitator 8. While the dust particles both from the cyclone preheater 4–7 and from the by-pass conduit 11, 14 are precipitated in the precipitator, the condensed chloride particles pass unimpeded through the precipitator and leave the process entirely if the raw materials have a comparatively low chloride content.

Precipitated and thus reusable raw material is returned to the preheated through conduit 16 for renewed treatment in the plant.

I claim:

1. A method of producing clinker from raw material with an average chloride content of 0.015–0.1 weight percent of all raw material used in a kiln plant having at least one suspension preheater, comprising the steps of:

passing kiln exit gas with a chloride content through said preheater to a primary precipitator or filter, causing a portion of said exit gas to bypass said suspension preheater;

quenching said exit gas portion; and passing said portion of exit gas after said quenching directly to said primary precipitator or filter without first encountering a separate precipitator or filter such that condensed chloride particles formed in said exit gas portion during the quenching step pass unimpeded through the primary precipitator or filter.

2. A method according to claim 1, further comprising the step of quenching said by-passing exit gas by atmospheric air.

3. A method according to claim 1, further comprising the step of returning dust collected by said primary precipitator or filter to the suspension preheater to be reused in the method.

* * * * *